(12) United States Patent
Smith et al.

(10) Patent No.: US 9,399,955 B2
(45) Date of Patent: Jul. 26, 2016

(54) METHOD AND APPARATUS FOR LOCAL LOOP CLOSURE

(75) Inventors: Mitchell Donald Smith, Morrow, OH (US); Charles Francis Hanley, Liberty Township, OH (US); David Allen Gutz, Wenham, MA (US)

(73) Assignee: General Electric Company, Schenectady, NY (US)

( * ) Notice: Subject to any disclaimer, the term of this patent is extended or adjusted under 35 U.S.C. 154(b) by 861 days.

(21) Appl. No.: 13/461,310

(22) Filed: May 1, 2012

(65) Prior Publication Data

US 2013/0223976 A1 Aug. 29, 2013

Related U.S. Application Data

(60) Provisional application No. 61/605,067, filed on Feb. 29, 2012.

(51) Int. Cl.
*F02C 9/00* (2006.01)
*G05B 19/042* (2006.01)
*G05B 15/02* (2006.01)

(52) U.S. Cl.
CPC . *F02C 9/00* (2013.01); *G05B 15/02* (2013.01); *G05B 19/0426* (2013.01); *G05B 2219/23115* (2013.01)

(58) Field of Classification Search
CPC .............. F15B 13/16; G06F 7/00; F02C 9/00; G05B 2219/23115
USPC ....................... 415/1; 700/72, 37; 365/189.05
See application file for complete search history.

(56) References Cited

U.S. PATENT DOCUMENTS

| | | | |
|---|---|---|---|
| 4,719,891 A | 1/1988 | Porth et al. | |
| 4,926,821 A * | 5/1990 | Porth et al. | 123/399 |
| 4,984,505 A * | 1/1991 | Leeson et al. | 91/361 |
| 6,202,012 B1* | 3/2001 | Gile et al. | 701/48 |
| 2003/0097511 A1* | 5/2003 | Choi et al. | 710/305 |
| 2010/0064657 A1 | 3/2010 | Mahoney et al. | |
| 2010/0127655 A1* | 5/2010 | Ward et al. | 318/621 |
| 2010/0223902 A1 | 9/2010 | Mailander et al. | |

OTHER PUBLICATIONS

EP Search Report for corresponding application No. 13157260.4-1807 dated Feb. 25, 2015.
Unofficial English Translation of Chinese Office Action issued in connection with corresponding CN Application No. 201310063876.6 on Aug. 28, 2015.

* cited by examiner

*Primary Examiner* — Christopher Verdier
*Assistant Examiner* — Juan G Flores
(74) *Attorney, Agent, or Firm* — General Electric Company; Pamela A. Kachur

(57) ABSTRACT

A method and apparatus for local loop closure is provided. The apparatus includes a component for use in a gas turbine engine. The component includes at least one of an actuator and a servo-valve, at least one sensor, and an electronic module comprising controller electronics and memory. The electronic module is configured to receive and process commands for the at least one of an actuator and a servo-valve and queue received commands in an input buffer.

6 Claims, 3 Drawing Sheets

METHOD AND APPARATUS FOR LOCAL LOOP CLOSURE

CROSS-REFERENCE TO RELATED APPLICATIONS

This application claims priority to Provisional Patent Application No. 61/605,067 filed Feb. 29, 2012, which is hereby incorporated by reference in its entirety.

BACKGROUND

The field of the invention relates generally to local loop closure of a component for use in a gas turbine engine.

Generally, gas turbine engines have numerous variable geometry features which are typically actuated by closed loop hydro-mechanical control systems. These control systems are typically comprised of actuators, sensors, and servo-valves all driven by loop closing electronics and software. The loop closing electronics and software reside in an electronic engine control unit that is positioned a significant distance away from the actuation hardware resulting in substantial electrical cabling, as well as control delays due to the separation. The amount of electrical cabling between these components is known to drive a significant portion of the weight within an engine as well as offer additional opportunities for failures. When system failures occur, it is often difficult to tell which part has failed due to the separation. Often, as a result of the failures, unsuccessful maintenance is undertaken or a "shotgun maintenance" approach is used, wherein several parts are removed at once to insure the problem is resolved.

BRIEF DESCRIPTION

In one embodiment, a component for use in a gas turbine engine is provided. The component includes at least one of an actuator and a servo-valve, at least one sensor, and an electronic module comprising controller electronics and memory. The electronic module is configured to receive and process commands for the at least one of an actuator and a servo-valve and queue received commands in an input buffer.

In another embodiment, a method for use in operating a component of a gas turbine engine is provided. The method includes receiving, by the component, commands for a hardware module of the component, processing, by the component, the received commands for the hardware module, and queuing, by the component, the received commands in an input buffer.

In yet another embodiment, one or more non-transitory computer-readable storage media having computer-executable instructions embodied thereon is provided. When executed by a processor, the computer-executable instructions cause the processor to receive, by a component of a gas turbine engine, commands for a hardware module of the component, process, by the component, the received commands for the hardware module, and queue, by the component, the received commands in an input buffer.

BRIEF DESCRIPTION OF THE DRAWINGS

FIG. 1 is a schematic view of a component in accordance with an exemplary embodiment of the present disclosure;

FIG. 2 is a data flow of the smart component shown in FIG. 1; and

FIG. 3 is a data flow of an integrator shown in FIG. 2.

DETAILED DESCRIPTION

The following detailed description illustrates embodiments of the invention by way of example and not by way of limitation. It is contemplated that the invention has general application to analytical and methodical embodiments of sensing process parameters in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
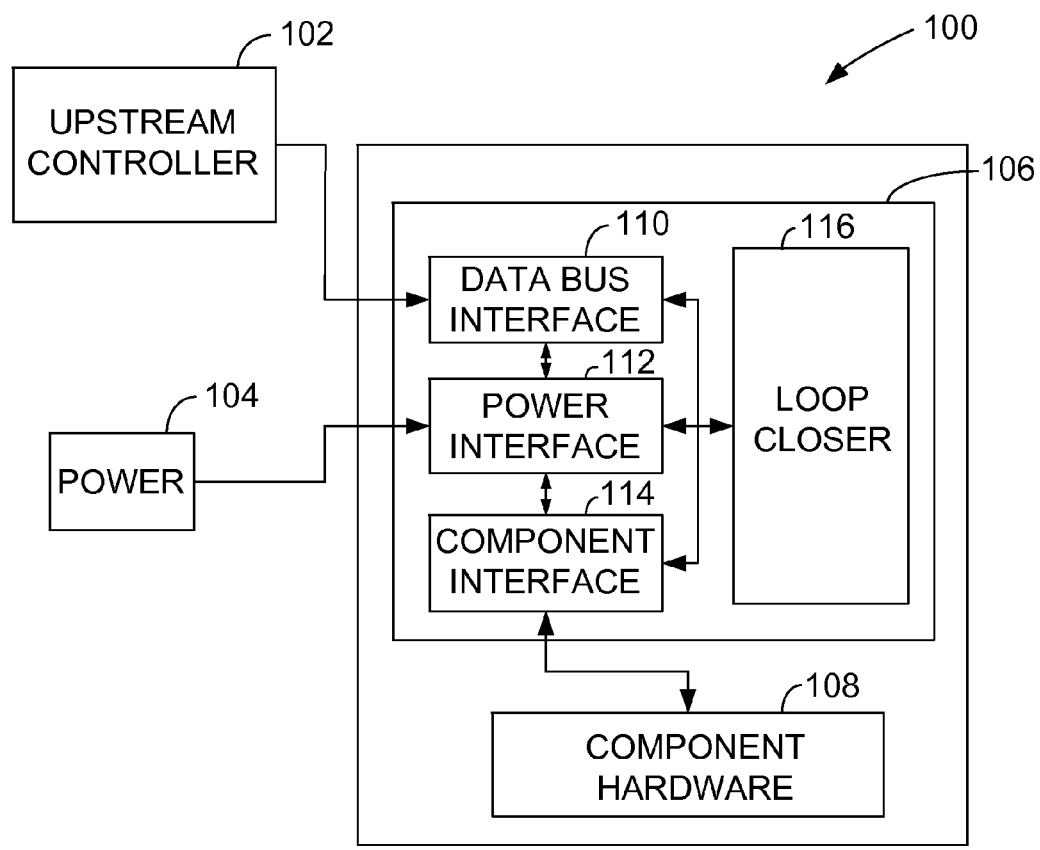
FIGS. 1-3 show exemplary embodiments of the method and system described herein.

FIG. 1 is a schematic view of a component 100 in accordance with an exemplary embodiment of the present disclosure. In the exemplary embodiment, component 100 is a hydro-mechanical control system that is used with a gas turbine engine. In the exemplary embodiment component 100 is driven by signals from upstream controller software 102 and power for component 100 is provided by power supply 104.

Component 100 includes an electronic module 106 that is in communication with component electrical hardware 108. In the exemplary embodiment, electrical hardware 108 includes, but is not limited to, linear or rotary actuators, position feedback sensors, and electro-hydraulic servo-valves. Electronic module 106 includes data bus interface circuitry 110, power interface circuitry 112, component specific circuitry 114, and a common loop closer module 116. Data bus interface circuitry 110 transmits signals from software 102 to component 100 and power interface circuitry 112 is in communication with power supply 104 that is configured to power component 100. Component specific circuitry 114 is in communication with component electrical hardware 108 and is configured to translate signals emanating from hardware 108 into module 106. In the exemplary embodiment, component specific circuitry 114 utilizes firmware and non-volatile media that is specific to hardware 108. In another embodiment the electronic elements 110, 112, 114, and 116 could be implemented as a single integrated design that provides similar functionality.

Common loop closer module 116 includes firmware, non-volatile media, and control electronics configured to process input signals and provide output demands to control hardware. In the exemplary embodiment, common loop closer module 116 is configured to receive communication from data bus interface circuitry 110, power interface circuitry 112, and component specific circuitry 114 and to process the communication locally within component 100.

Figure 2:
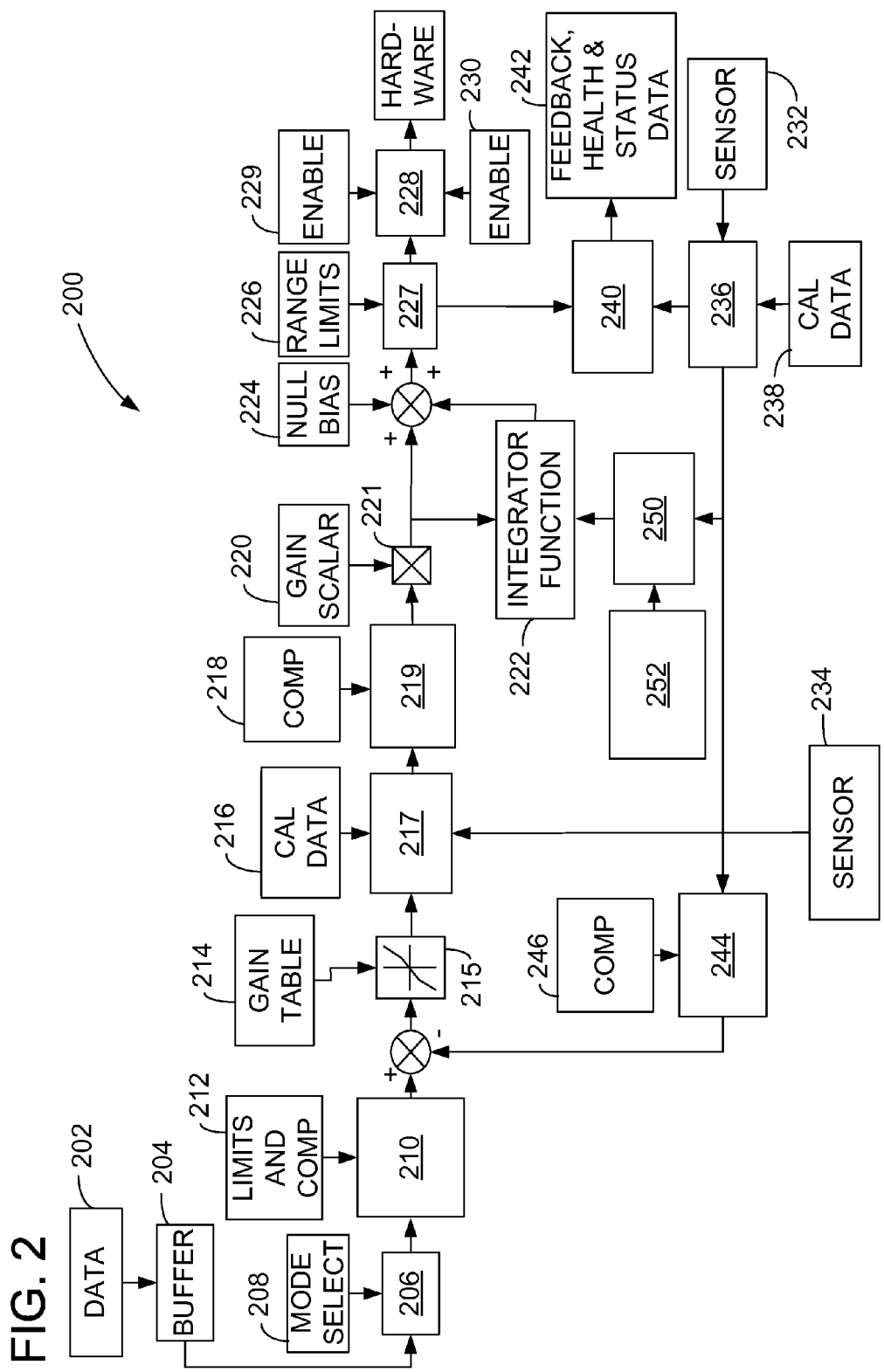

FIG. 2 is a data flow 200 within component 100 shown in FIG. 1. In the exemplary embodiment, data 202 is introduced into flow 200 and received by a buffer 204. In the exemplary embodiment, data 202 are command signals utilized for operation of hardware 108. Alternatively, data 202 can be any signal that could be transmitted and processed by component 100 as described herein. In one embodiment, data 202 is received by buffer 204 every 10 milliseconds. Alternatively, data 202 can be updated to buffer at any time increment including but not limited to asynchronously, every 1 millisecond, every 2 milliseconds, and every 20 milliseconds. Data 202 can originate from any portion of a gas turbine including but not limited to software 102 shown in FIG. 1 or a primary processing unit such as a Full Authority Digital Engine Control (FADEC).

Buffer 204 is configured to queue data 202 before a mode is selected 206. In the exemplary embodiment, when input signal 202 fails or command data signals 202 are not updated, the local controller can continue to close the loop, positioning hardware 108, following the trajectory prescribed in buffer 204, which was continuously updated with the desired failure position and trajectory information. In one embodiment, input buffer 204 includes failure instructions that command hardware 108 to operate in a predetermined manner as a result of a loss of input signal 202.

In one embodiment, a mode is selected 206 from a mode select signal 208 that is not part of data 202. Mode select 206 is a command relating to the operation of hardware 108. Mode select 206 is configured to execute commands such as, but not limited to, an auto check, an auto calibration, a health test, and an inactivity command. After a mode is selected 206, data 202 is subject to rate limiting and additional loop compensation 210. In one embodiment, input limits 212 are provided that correspond to the specifics of component 100. In the exemplary embodiment, the rate of data 202 is limited by the input limits 212 and modified by lead/lag dynamics to determine an optimal input signal for the loop.

A proportional gain table 214 is then utilized to provide 215 a shaped gain. Proportional gain table 214 supports both a simple fixed gain, or as an input adjustment, an increasing gain with error (gain kicker) for improved response tracking at high rates. In one embodiment, calibration data 216 is provided to hardware gain function 217 to modify data flow from gain 215. In such an embodiment, calibration data 216 is retrieved from local non-volatile memory. Calibration data 216 includes information such as, but not limited to, trim, bias, gain, and potential dynamic compensation values which are used locally for signal calibrations and corrections. Calibration data 216 improves nominal feedback accuracy and hardware 108 null shifts and gains.

In the exemplary embodiment, loop compensation variables 218 are provided to loop compensation 219 to optimize closed loop dynamic response. In one embodiment, loop compensation variables 218 are phase leads that are updated by adjustment over the command data bus. A gain scalar 220 is applied to multiplier 221 to adjust for predictable gain variations. In the exemplary embodiment, gain scalar 220 is defined by adjustment over the command data bus. In another embodiment, gain scalar 220 is a function stored in local non-volatile memory. In the exemplary embodiment, an integrator function 222, described in more detail below, is used to reduce tracking errors due to unpredicted servovalve null shifts and motion.

In the exemplary embodiment, a null bias 224 is provided to accommodate a predictable shift that may result from load or pressure changes. In one embodiment, null bias 224 is defined by adjustment over the command bus. In one embodiment, null bias 224 is normalized in units of actuator rate (e.g. %/sec). Null bias 224 is set for each specific application and assists a null bias integrator, and reduces transient impulse due to resets and channel transfers. In one embodiment, null bias 224 is used in real time to correct tracking errors due to pressure and load leakage.

Range limits 226 are then utilized by a torque motor driver 227 before being passed to a driver enable function 228 that is configured to allow control of hardware 108. In the exemplary embodiment, range limits 226 support either active-active or active-standby architecture. In one embodiment, if two channels are being utilized for component 100, half of range limits 226 would be used on each channel. Driver enable signal 229 is defined by adjustment over the command bus to disable driver 228 outputs. Driver enable 230 is an independent hard-wired input signal that provides additional failure accommodation options, not available using only the data bus for channel selection. In one embodiment, driver enable 230 is jumpered in the component interface connector for applications where this function is not required.

In the exemplary embodiment, component 100 and flow 200 include sensors 232 and 234 that are configured to provide feedback to component 100. Sensors 232 and 234 monitor engine operation and input real-time actual sensor data. Position feedback sensor 232 is used to close the position control loop, other sensors 234, include pressures and temperatures within component 100, but also may include other sensors across the engine, such as a fan inlet temperature sensor, a compressor inlet total pressure sensor, a fan discharge static pressure sensor, a compressor discharge static pressure sensor, an exhaust duct static pressure sensor, an exhaust liner static pressure sensor, a flame detector, an exhaust gas temperature sensor, a compressor discharge temperature sensor, a compressor inlet temperature sensor, a fan speed sensor, and a core speed sensor. Local sensors 232 and 234 facilitate operation of component 100 as well as local compensation for typical sources of variation such as temperature, pressure, and load.

In one embodiment, sensor 232 is a position sensor and sensor 234 is a pressure sensor that both provide feedback to a position calibration function 236. Position calibration 236, in addition to information received from sensors 232 and 234, receives calibration data 238 from local non-volatile media. In one embodiment, data received by position calibration function 236 is coupled with data from torque motor driver 227 and transmitted to a health and status logic 240, which outputs feedback, health and status data 242. Feedback, health and status data 242 can include any information about component 100 including, but not limited to, position, voltages, currents and null bias information. In one embodiment, health and status data is utilized by the FADEC for higher level redundancy management & channel selection.

In one embodiment, data received by position calibration function 236 is transmitted to loop compensation 244 such that lead/lag dynamics can be optimized. In the exemplary embodiment, loop compensation 244 utilizes loop compensation variables 246 to modify feedback dynamic response characteristics before data is coupled with data emanating from rate limiting and loop compensation 210. In one embodiment, loop compensations 210, 219, and 244 are operated such that if local inner loop operates at a significantly higher update rate and bandwidth on the command bus than biased position commands coming over the command bus from an upstream location, loop compensations 210, 219, and 244 can be utilized as a smoothing function to reduce inner loop noise caused by command stair-steps.

Figure 3:
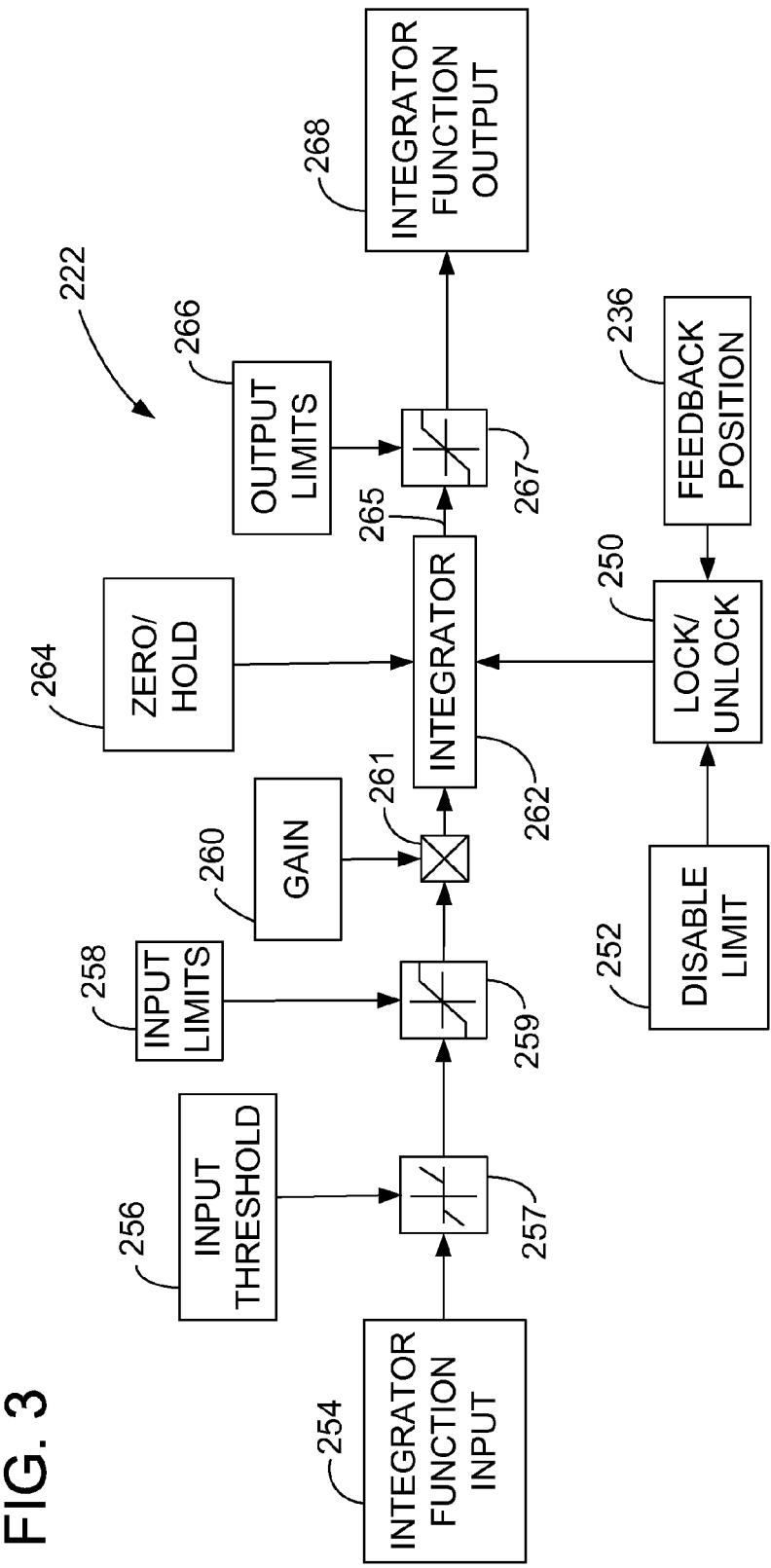

FIG. 3 is a data flow of integrator function 222 shown in FIG. 2. In the exemplary embodiment, data received by position calibration function 236 is transmitted to integrator function 222 via an integrator lock and unlock feature 250. In one embodiment, hardware position based limits 252 are provided to feature 250 along with data received by position calibration 236 before being passed to integrator 262. Feedback based integrator lock and unlock limits 252 are defined by adjustment over the command bus. In one embodiment, feature 250 is utilized as a separate feature, such that integration should reset to zero during power-up or reset.

In the exemplary embodiment, an integrator function input 254 is provided to integrator function 222 and modified 257 in relation to a threshold 256 to determine if integration is necessary. In one embodiment, threshold 256 is a discrete value, such as, but not limited to 1 milliamp. Alternatively, threshold 256 can be any value that facilitates integration as described herein. Input 254 is then checked 259 against input limit 258 to limit the maximum integrator input before an integrator gain 260 is applied 261. In the exemplary embodiment integrator gain is defined by adjustment over the command bus and is a function of pressure or expected loads.

In the exemplary embodiment, an integrator 262 receives data from integrator lock and unlock feature 250, input 254, and zero/hold inputs 264. Integrator 262 then integrates to provide an integrator output 265. Output 265 is compared 267 with output authority limits 266 to determine if a present value of an error is determined to exceed a predetermined threshold. If a present value of an error is determined to exceed a predetermined threshold, an integrator function output 268 is limited to the output authority limit values 266. In the exemplary embodiment authority limits 266 are defined by adjustment over the command bus.

In the exemplary embodiment, integrator function 222 is shown to be placed after a gain scalar 220 is applied 221. However, integrator function 222 can be utilized anywhere within data flow 200 that facilitates local loop closing as described herein.

As used herein, the terms "software" and "firmware" are interchangeable, and include any digital signal flow logic stored in memory for execution by controller circuitry, including RAM memory, ROM memory, EPROM memory, EEPROM memory, and non-volatile RAM (NVRAM) memory. As used herein, the terms "controller" and/or "controller circuitry" include a processor configured to at least execute instructions and process signals. The above memory types are exemplary only, and are thus not limiting as to the types of memory usable for storage of logic and controller instructions.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer readable media may be, for example, but not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network. In the exemplary embodiment, all software logic located locally is firmware and does not change for most applications. The tuning/configuring of this firmware is provided by inputs from the upstream processors.

The above-described embodiments of a method and system for local loop closer provides a reliable means for closing electronics into a single unit. As such, processing demands on high demand processing systems is reduced. The elimination of cabling also provides a weight reduction to engines utilizing the methods and system described herein. Additionally, processing bandwidth can be increased significantly resulting in significant performance improvements. Also, improved reversionary modes and fault accommodation are provided with less hardware redundancy. Failure accommodation and reversionary modes are significantly improved over legacy, using the input buffer feature.

The embodiments described above also provide smoothing & asynchronous operation features to support significantly higher loop closure update rates (<2 ms), enabling enhanced tracking performance and disturbance rejection, trajectory based input signal buffering for improved failure accommodation, and selectable maintenance modes and NVM storage of data to support automatic rigging and calibration. Additionally, fewer connections provide improved reliability, and improved supportability is provided due to better fault/failure isolation. Also because of the localization of processing, the embodiments above provide for improved reversionary modes and accommodation of failures. In the exemplary embodiment several input parameters are provided over the command data bus. These inputs are provided at various update rates, with the most time-critical command signals provided at the highest rate. Other less time-critical inputs, such as, but not limited to, compensation and limits can be provided at much lower rates to reduce data bus traffic without limiting loop closer performance. In another embodiment, many of these inputs do not require regular adjustment, and utilize data values stored as non-volatile memory within component 100. If adjustment is desired, these data values are replaced by data provided over the command data bus.

A technical effect of the systems and methods described herein includes at least one of: (a) receiving, by the component, commands for a hardware module of the component; (b) processing, by the component, the received commands for the hardware module; and (c) queuing, by the component, the received commands in an input buffer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for use in operating a component of a gas turbine engine, the component comprising an electronic module comprising a controller and memory, and a control loop, said method comprising:
   receiving, by the component, commands for a hardware module of the component;
   processing, by the component, the received commands for the hardware module;
   queuing, by the component, the received commands in an input buffer; and wherein the method further comprises providing a null bias integration to the control loop; and wherein said electronic module is further configured to receive and process a first input at a first data rate and a second input at a second data rate.

2. A method in accordance with claim 1, wherein the method further comprises storing failure commands within the input buffer.

3. A method in accordance with claim 2, wherein the method further comprises executing failure commands upon the loss of received commands in the input buffer.

4. A method in accordance with claim 1, wherein the method further comprises providing lead/lag compensation to the received commands.

5. A method in accordance with claim 1, wherein the method further comprises providing adjustable gains to the control loop.

6. A method in accordance with claim 1, wherein the method further comprises executing a health and status check of the component from instructions stored in local non-volatile memory.

\* \* \* \* \*